United States Patent [19]

Leedom, Jr.

[11] Patent Number: 5,329,447
[45] Date of Patent: Jul. 12, 1994

[54] HIGH INTEGRITY COMPUTER IMPLEMENTED DOCKETING SYSTEM

[76] Inventor: Charles M. Leedom, Jr., 6524 Truman La., Falls Church, Va. 22043

[21] Appl. No.: 850,484

[22] Filed: Mar. 12, 1992

[51] Int. Cl.$^5$ .................... G06F 15/38; G06F 15/20
[52] U.S. Cl. ........................ 364/419.19; 364/400; 364/401
[58] Field of Search ............ 364/400, 401, 419, 406

[56] References Cited

U.S. PATENT DOCUMENTS 5,175,681  12/1992  Iwai et al. .................... 364/400

Primary Examiner—Roy N. Envall, Jr.
Assistant Examiner—Khai Tran
Attorney, Agent, or Firm—Sixbey, Friedman, Leedom & Ferguson

[57] ABSTRACT

A computer implemented deadline docketing system for receiving, organizing and reporting future deadline calendar dates. The system includes a report generator for generating an operator viewable first report of all unverified future calendar dates which are stored in the system. The system also includes a verification recorder for converting unverified future calendar dates into verified dates by receiving and storing in association with a future calendar date a human operator generated verification signal whenever a human operator has independently verified the accuracy of the corresponding calendar date. The system is also organized to provide in the first report a complete chronological record, in the form of a Table of Contents, of all deadline calendar dates which have been entered into the system in association with a particular law case identified by a unique record key along with a word description of the action required, the verification status, the date upon which the required action was completed and a word description of the action taken to satisfy the calendar date deadline.

29 Claims, 10 Drawing Sheets

FIG. 3

PATENT INFORMATION
01/22/1992 @ 12:56

DOCKET NO: XXX-XXX  RESP. ATTY: DOE, CHARLES M.
OLD DOCKET NO: XXX  ASSN. ATTY: DOE, JEFFREY L.
OLD MATTER NO: XXX-XXX  STORAGE BOX NO:

TITLE: PLASMA COATING

COUNTRY: USA  STATUS: PENDING
SERIAL NO: 07/XXX,XXX
FILING DATE: 03/20/1991  CASE TYPE: UTILITY

CLIENT: ENGINE COMPANY, INC.  REF:
ASSIGNEE: ENGINE COMPANY, INC.  DATE: 05/24/1991
RECORDATION DATE: 06/03/1991  REEL: XXXX  FRAME: XXX - XXX

PATENT NO:
ISSUE DATE:
TERM:

INVENTORS:
DOE, JAMES E.    DOE, BUEL D.

FOREIGN ASSOCIATE:
FOREIGN PRIORITY DATA:
COUNTRY:  PRIORITY DATE:
SERIAL NUMBERS:

PRIORITY DATA FILED:

NOTES:

TABLE OF CONTENTS FOR XXXX-XXXX —44         —43

| (a) | (b) RESPONSE DUE | (c) RVU | (d) RESPONSE FILED | (e) RESPONSE |
|---|---|---|---|---|
| OFFICIAL ACTION | | | | |
| MISSING APPLICATION PART DUE | 06/02/1991 | CML | 06/03/1991 | DECLARATION, POWER OF ATTY. & ASSIGNMENT FILED 6-3-91 —54 |
| INFORMATION DISCLOSURE STMT. (EXTENDED FROM 6-20-91) | 10/01/1991 | RAM | 09/04/1991 | INFORMATION DISCLOSURE STMT. MAILED 9-3-91 |
| FOREIGN FILING DUE | 03/20/1992 | | | |
| HAS PTO ACTED ON CASE? | 09/20/1992 | YES | | |

48 braces (b) and (c); 50a points to CML; 50b points to YES; 52 points to 06/03/1991; 46 points to left column.

FIG. 4

LAW FIRM, P.C.

RESPONSIBLE ATTORNEY LISTING OF UNREVIEWED CALENDAR ENTRIES FOR THE PERIOD 12/22/1991 THRU 01/14/1992

PAGE 1

01/21/1992 @ 09:19:59

CML
07/07/1995 DUE
06/07/1995 TICKLER
05/07/1995 TICKLER
04/07/1995 TICKLER

XXXX-XXXX/XX-XXX-XXXX-USA-L PATENT NO. X,XXX,XXX    INVENTOR: DOE, ROBERT A.
RIVER CORPORATION
METHOD AND APPARATUS
3.5 YEAR PATENT MAINTENANCE FEE DUE

CML
07/07/1995 DUE
06/07/1995 TICKLER
05/07/1995 TICKLER
04/07/1995 TICKLER

XXXX-XXXX/XX-XXXX-USA-L PATENT NO. X,XXX,XXX    INVENTOR: DOE, MORRIS W.
RIVER CORPORATION
CARTON
3.5 YEAR PATENT MAINTENANCE FEE DUE

CML/JLC
02/04/1992 DUE

XXX-XXX    INVENTOR: DOE, GALYN A.
RIVER CORPORATION
EMBOSSING
FOREIGN FILING DUE

FIG. 5A

LAW FIRM, P.C.
RESPONSIBLE ATTORNEY CALENDAR LISTING FOR THE PERIOD 04/01/1991 THRU 04/06/1991

04/04/1991 @ 14:25:01
PAGE 1

04/01/1991

| CML | DUE | XXXX0001 |
| --- | --- | --- |
| | | ENGINE COMPANY |
| | | MACHINING |
| | | BAR DATE (DUE) |
| CML | DUE | XXXX0001 |
| | | ENGINE COMPANY |
| | | INJECTOR |
| | | BAR DATE (DUE) |
| CML | DUE | XXXX0001 |
| | | ENGINE COMPANY |
| | | INJECTOR |
| | | BAR DUE |
| CML | DUE | 0XXX0002 REGISTRATION NO. X,XXX,XXX |
| | | SYSTEMS, INC. |
| | | NOTIFY CLIENT: 8/15 DECLARATION DUE 10-1-91 |
| CML | TICKLER | 0XXX000X |
| | | BERNARD DOE, D.D.S. |
| | | DEVICE |
| (DUE 05/31/1991) | | FOREIGN FILING DUE |

| | | |
|---|---|---|
| CML | DUE | XXX20001<br>ENGINE COMPANY, INC.<br>CUMNS-XXX ALGORITHM<br>BAR DATE (DUE) |
| CML | DUE | XXX10001 REGISTRATION NO. X,XXX,XXX<br>INDUSTRIES, INC.<br>SECTION 8/15 DECLARATION DUE |
| CML | TICKLER | 0XXX0004<br>THE CORPORATION<br>MACHINES |
| (DUE 06/02/1991) | | WRITTEN REQUEST FOR NOVELTY EXAMINATION DUE |

FIG. 6

PATENT INFORMATION
10 / 28 / 1991 @ 16 : 06

DOCKET NO:    0XXX-XXXX    120 — RESP. ATTY: DOE, CHARLES M.
115 — OLD DOCKET NO:           122 — ASSN. ATTY: DOE, CHARLES M.
113 — OLD MATTER NO:          136 — STORAGE BOX NO:
    TITLE:   ASSEMBLY AND METHOD

118 — COUNTRY:   JAP    129 — PATENT NO:      128 — STATUS: PENDING
127 — SERIAL NO:   X-XXXXX   130 — ISSUE DATE:
126 — FILING DATE: 09/13/1991   134 — TERM:           110 — CASE TYPE: UTILITY

114 — CLIENT:   RIVER CORPORATION           112 — REF: 1177
116 — ASSIGNEE:                                           DATE:
138 — RECORDATION DATE:       140 — REEL:    142 — FRAME:

144 — INVENTORS:
    DOE, OSCAR       DOE, RICHARD K.

132 — FOREIGN ASSOCIATE: ASSOCIATE (THEIR REF: XXX-XXXX-D)
124 — RELATED CASES:

| COUNTRY | RELATIONSHIP | DOCKET NO | SERIAL NO | FILE DATE | PATENT NO | ISSUE DATE |
|---------|--------------|-----------|-----------|-----------|-----------|------------|
| JAP | DIV. OF | 0XXX | XX-XXXXX | 08/02/1985 | | |

NOTES:

FIG. 7

ADD NEW CALENDAR ENTRY

ADD  FIND  VERIFY  QUIT

146~ DOCKET NUMBER:        0XXX-00XX/XXX  154~ SERIAL NUMBER: 07/XXX,XXX
                                           156~ FILING DATE:     03/0X/X990
148~ OLD DOCKET NUMBER: X0-00XX-USA-G  158~ REG. NUMBER:
                                           160~ ISSUE DATE:
150~ TITLE/MARK: "SYSTEMS FOR INTERNAL
        COMBUSTION ENGINES" (THEIR REFERENCE NO. MX0-XXXX)

152~ RESP. ATTY: DOE, GERALD J.       162~ ASSN. ATTY: DOE, GERALD J.

164~ BASE DATE:      11/08/1991  TASK CODE: 11       TASK:    ISSUE FEE DUE
170~ DUE DATE:       02/08/1992                       ~168
172~ RESPONSE REQ'D: Y      SUBTASK CODE:      SUBTASK:
                                 ~174                  ~178
180~ COMMENT: ISSUE FEE DUE

• TICKLER 1: 12/08/1991    TICKLER 2: 01/08/1992    TICKLER 3:  / /
                                QUIT TO: VIEW/EDIT CALENDAR ENTRY

1HELP   2       3      4CASE   INFO5     6       7       8

HIGH INTEGRITY COMPUTER IMPLEMENTED DOCKETING SYSTEM

FIELD OF THE INVENTION

This invention relates to a computer implemented docketing system for recording, organizing and reporting deadline calendar dates to help individuals take required actions within the reported deadline calendar dates and to provide organizations with a system for insuring that required actions are completed within the reported deadline dates. This invention is particularly useful to attorneys, such as patent attorneys, who are responsible for meeting calendar deadlines in order to secure legal rights for their clients.

BACKGROUND OF THE INVENTION

Professionals, such as lawyers and accountants, are often confronted with the requirement to take actions within calendar date deadlines imposed by statutes and governmental agencies. For a professional to rely on his memory to meet such deadlines would be quite risky to his client's substantive rights as well as to his own professional reputation.

The problem associated with assuring compliance with legal deadlines is particularly acute for patent and trademark practitioners who customarily handle a very large number of separate cases as compared with attorneys who work on only a comparatively small number of cases. Moreover, patent and trademark practitioners confront, in each case, a bewildering array of deadlines such as deadlines for filing original U.S. applications to avoid bar dates defined by the United States Patent Laws, 35 U.S.C. § 102(b), 1 year deadlines for provoking an interference by copying claims from an issued patent under 35 U.S.C. § 135(b) and 2 year deadlines for filing broadening reissue applications under 35 U.S.C. § 251, and regulatory Patent and Trademark Office (PTO) response deadlines such as one month and two month missing parts deadlines under 37 C.F.R. 1.53(d), two month Ex parte Quayle deadlines in accordance with § 714.14 of the Manual of Patent Examining Procedure (MPEP) shortened statutory deadlines under 37 C.F.R. 1.134, special rules regarding deadlines for responses after final rejection 37 C.F.R. 1.113, notice of appeal deadlines under 37 C.F.R. 1.191, oral hearing request deadlines under 37 C.F.R. 1.194(b), deadlines for filing petitions for extensions of time 37 C.F.R. 1.136, deadlines for payment of issue fees under 37 C.F.R. 1.311, and maintenance fee deadlines under 37 C.F.R. 1.362. Trademark cases often involve response deadlines under 37 C.F.R. 2.62 and deadlines for filing notices of opposition under 37 C.F.R. 2.102(c). A typical practitioner confronts a vast array of additional deadlines associated with interference proceedings and hearings before the Trademark Trial and Appeal Board to say nothing of Federal Rules and U.S. Court rules involving patent and trademark litigation and appeal practice before the Court of Appeal for the Federal Circuit.

An attorney who handles the filing of corresponding foreign patent and trademark applications will confront yet another array of calendar date deadlines based on the statutes and laws of the country or tile international convention under which the corresponding applications are filed. Incredibly it is also a requirement of the U.S. Patent and Trademark Office in certain limited circumstances outlined in § 203.08 MPEP, that practitioners assume responsibility for discovering PTO and/or postal service errors by conducting periodic checks of the status of cases for which the practitioner is the attorney or agent of record. For example, an official action setting a calendar date deadline might not be received by a practitioner because the PTO forwards the action to an improper address. Nevertheless, the PTO can require an applicant in such circumstances to disclaim the terminal portion of a patent because the practitioner failed to conduct a timely status check to determine if an action has been mailed. The need for such periodic status checks places an additional burden on a practitioners' docket system to remind the practitioner when a status check should be filed.

In a busy patent and trademark practice involving hundreds of cases and literally thousands of deadlines each year, no human being, relying upon his memory, could be certain that appropriate actions are taken within all such deadlines. While the Patent and Trademark Office has recently been empowered by statute to revive cases upon unintentional abandonment under 37 U.S.C. § 1,137(b), such revival proceedings give rise to undesirable delay and very substantial penalty fees. Moreover, certain statutory deadlines are nonextendable such as deadlines for avoiding bar dates under 35 U.S.C. 102(b), deadlines for copying claims from an issued patent to provoke an interference and deadlines for filing a reissue or foreign convention application. Failure to act within these deadlines can result in irretrievable loss of substantive and/or procedural rights.

Traditionally, patent and trademark attorneys have relied upon manual docketing systems involving complicated manual ledger and or movable card systems for recording and organizing their deadline calendar dates to generate timely reminders for appropriate actions to be taken. Such manual systems require the attention of skilled docketing clerks with oversight supervision from the attorney or require the direct day-to-day attention of the attorney himself in order to assure reliable operation. PTO policy is particularly stringent with respect to attorneys who choose to perform the primary function of determining calendar date deadlines because the attorney is presumed to know the law and he is held strictly accountable for any mistake brought about by ignorance of the law or rules. This standard contrasts with PTO policy regarding mistakes made by non-attorney docket clerks whose mistakes can be deemed "unavoidable" under circumstances where the clerk is skilled and trained and has proven over time to be competent and reliable in implementing a well planned docketing system.

Despite very careful controls and attention, manual docketing systems often break down. Such breakdowns can be minimized by a system of cross-checks and vigilant adherence to well designed procedures but no system can be expected to operate flawlessly. Indeed, a leading authority on risk management for attorneys reports that the greatest cause of claims against trial attorneys involves time/docket control issues which most often are caused by the failure of a reminder system rather that an incorrect deadline determination, Stern, D. N., "Can Trial Lawyers Successfully Control Their Malpractice Risks?", *Virginia Lawyer*, Vol. 39, No. May 11, 1991, p. 40.

One approach for improving the reliability of a docketing system is to employ a computer to perform organizing, date calculating and reporting functions. Computers have the capability of managing massive amounts of data with a far greater degree of accuracy than any practical manual docketing system. Indeed quite sophisticated computer implemented systems for managing patent and trademark calendar deadlines are known. For example, a commercially available computer implemented docketing system is offered and supported by Computer Packages Inc. of Rockville, Md. Using DATAEASE Data Base Language, this system provides for patent prosecution docketing and reminders for U.S. maintenance fee as well as status checks. Moreover foreign filing, deferred examination, invention disclosure statements and foreign annuity payment deadlines may be computer calculated. The trademark system provides for trademark proof of use (Sections 8 & 15 and foreign) and renewal docketing. Additional features of the Computer Packages System include:

(1) the ability to modify data base and/or user defined reports (2) automatic completion of field entries (codes and macros)

(3) prosecution history maintained in the computer (4) import/export of data (5) browse or any data field or combination of data fields (6) usable or personal computers and local area networks (LAN's)

(7) multi tasking and "windows" capabilities.

While highly sophisticated, computer implemented docketing systems can never be more reliable than is the data entered into the docketing system. Admittedly, computer deadline calculation can help improve accuracy by minimizing the potential for human error in determining the proper calendar deadline. For example the 3 month deadlines for responding to PTO Official Actions can be calculated and stored by the computer based on the entry of an office action mailing date. Similarly, a maintenance fee payment deadline can be computer calculated and stored from entry of the issue date of a patent. Accuracy is improved because the user is required merely to enter a date printed or typed on an official document. In a manual system, the user must first note the mailing date of the Official Action and proceed to calculate from this date a deadline calendar date based on the legally imposed deadline period for response. Obviously, a computer system programmed to perform deadline date calculations is superior to a manual system but the computer system is still dependent upon the accuracy of the user entered data with respect to the mailing date entered, the case identification and the proper identification of the legally imposed deadline, for example, "restriction requirement—30 days", "official action—3 months" or "maintenance fee—3½ years".

Another type of computer implemented docketing system is being offered by Computer Patent Annuities, P.O. Box 779. 1BL, Channel Islands, United Kingdom. The computer implemented system, known as Intellectual Property Management System, involves sophisticated deadline date calculation, recording, organizing and reporting functions based on operator supplied information. However, no provision has been made for subsequent entry of human operator generated verification signals indicative of subsequent, independent verification of the initial operator entered data.

Thus prior art computer implemented docketing systems have failed to provide very much in the way of mechanization which can detect improperly entered information that can lead to improper deadline calendar date reminders.

SUMMARY OF THE INVENTION

A primary object of this invention is to provide a human operator controlled computer implemented deadline docketing system which overcomes the disadvantages of the prior art and in particular provides a higher degree of integrity than can be achieved by prior systems.

A more specific object of this invention is to provide a human operator controlled computer implemented deadline docketing system including verification recording means by which unverified future calendar date signals recorded in the system can be independently verified by a human operator.

A still more specific object of this invention is to provide a human operator controlled computer implemented deadline docketing system including verification recording means for converting an unverified future calendar date signal into a verified future calendar date signal by receiving and storing in the system a human operator generated verification signal indicating that the human operator has independently verified the accuracy of the corresponding future calendar date.

Yet another object of this invention is to provide a human operator controlled computer implemented deadline docketing system including deadline recording means for receiving and storing unverified calendar dates by which action must be taken in one of a plurality of law cases; report generating means for generating, in response to an operator entered signal identifying a particular law case, an operator viewable first report of all unverified future calendar dates stored in the system for a particular law case; and verification recording means for receiving and storing in the system a human operator generated verification signal indicating that the human operator has independently verified the accuracy of each corresponding future calendar date.

Still another object of this invention is to provide a docketing system of the type described above wherein the report generating means operates to generate a second report including the unverified future calendar dates associated with a plurality of cases whereby the second report can operate to remind the system operator that future calendar dates recorded in the system remain unverified and wherein the report generating means operates to include in the second report only those future calendar dates which have remained unverified for at least a minimum time to permit adequate time for verification to take place before a reminder is generated.

Another object of this invention is to provide a docketing system of the type described above wherein the report generating means operates to list in each first report, in chronological order, all calendar dates which have been recorded in the system in association with a particular law case, a description of the action required by the corresponding recorded calendar date, an indication of whether the corresponding calendar date has been verified, and an indication of whether the required action has been undertaken.

Another object of this invention is to provide a docketing system of the type described above further including a hard copy image forming device for creating a hard copy of the first reports whereby a hard copy of the first report for each law case identified in the system can be placed in a corresponding file containing a hard copy of the papers associated with that law case to form a chronological table of contents of all docketed actions and responses for the hard copy file of the law case.

Yet another object of this invention is to provide a docketing system of the type described above including a plurality of closable file folders adapted to receive and to retain therein the hard copies of papers associated with the corresponding law case wherein each file folder includes a transparent outer panel and attaching means for retaining a first report associated with the corresponding law case in a position which will allow the retained first report to be viewed through the transparent panel when the file folder is closed.

Still another object of this invention is to provide a docketing system of the type described above further including at least one video monitor which is capable of creating video images of the information contained in the first and second reports;

user class defining means for limiting certain system functions such as calendar date entry and modification of entered dates, to only designated users, daily docket report generating means for listing all calendar dates corresponding to signals stored in the system grouped by date and grouped by practitioner responsible for the corresponding law cases identified in the report;

automatic calendar date calculation means for docketing automatically tickler dates, determined from the operator entered calendar date; additional future calendar dates by which responsive actions must be taken such as an appeal date and status check date whenever a final rejection calendar date is entered;

automatic verification means for entering verification signals for all calendar dates generated automatically upon operator verification of the information from which the automatically generated dates were calculated by the computer, and data integrity checking means for determining potentially erroneous or missing calendar date signals recorded in the system.

Another broad object of this invention is to provide a human operator controlled computer implemented deadline docketing system for a plurality of patent cases including data integrity checking means for determining potentially erroneous or missing calendar date signals in the system by receiving and storing human operator entered signals representing the range of patent numbers corresponding to the patents issued during predetermined periods of time spanning a pair of calendar dates and by determining if any case identifier signals are stored in said non-volatile memory means for which appropriate future calendar date signals relating to patent maintenance fees are not stored in the system and by generating a human operator viewable listing of case record keys for which appropriate calendar dates are not found.

Still another object of this invention is to provide a method for docketing and reporting deadline dates for a plurality of law cases by utilizing a programmed computer system having a non-volatile memory and a report generator which is capable of generating a report based on the results of a search and compare function under control of the computer program, including the step of converting stored unverified future calendar date signals to verified calendar date signals in response to a human viewable report by storing in the non-volatile memory in association with the corresponding stored calendar date a verification signal generated by a human operator who has independently calculated the calendar date and verified the accuracy of the corresponding stored future calendar date after viewing the human viewable report.

Yet another object of this invention is to provide a human operator controlled computer implemented deadline docketing system for producing a plurality of reports for performing the function of a typical docketing system while also using the system to automatically create a Table of Contents for cases entered into the system. The Table of Contents is also designed to serve as a notification to the practitioner responsible for the corresponding case of all deadline calendar dates entered into the system and to alert the practitioner if any listed deadline date has not been independently verified.

Still other and more specific objects may be achieved by the subject invention as can be better understood by considering the following Brief Summary of the Drawings and Detailed Description of the Preferred Embodiments.

BRIEF DESCRIPTION OF THE DRAWINGS

FIG. 3 is an elevational view of a first type of human viewable report resulting from operation of the system illustrated in FIGS. 1 and 2 wherein unverified and verified deadline calendar dates associated with a particular patent application are listed chronologically.

FIG. 4 is an elevational view of a second type of human viewable report resulting from operation of the system illustrated in FIGS. 1 and 2 wherein unverified deadline calendar dates associated with a plurality of patent applications for whom a particular practitioner is responsible.

FIGS. 5(a) and 5(b) together are an elevational view of a third type of human viewable report resulting from operation of the system illustrated in FIGS. 1 and 2 wherein future deadline calendar dates recorded in the system and falling with a defined calendar period are grouped and listed by responsible attorney.

FIG. 6 is an elevational view of a screen displaying all of the data entered in the fields associated with a particular patent law case.

FIG. 7 is an elevational view of a screen displaying all of the data entered in the fields associated with a particular calendar deadline date entered into the system designed in accordance with the subject invention.

DETAILED DESCRIPTION OF THE PREFERRED EMBODIMENTS

The system and method of the subject invention operates to record, organize and report deadline calendar dates. The system and method is particularly useful to aid patent and trademark practitioners to record, store, organize, and report information relating to deadline calendar dates by which actions must be taken in one or more of a plurality of patent or trademark cases in order to preserve or create legal rights. Such deadline calendar dates may arise from U.S. or foreign country statutory requirements or from the rules of practice of a patent and trademark agency. Patent and trademark practitioners also encounter deadline calendar dates associated with their practice before U.S. courts and may be responsible for taking actions relating to cases involving foreign judicial proceedings. The subject invention is designed to provide timely reminders to system users with a higher degree of accuracy than is achievable by prior know systems.

Figure 1:
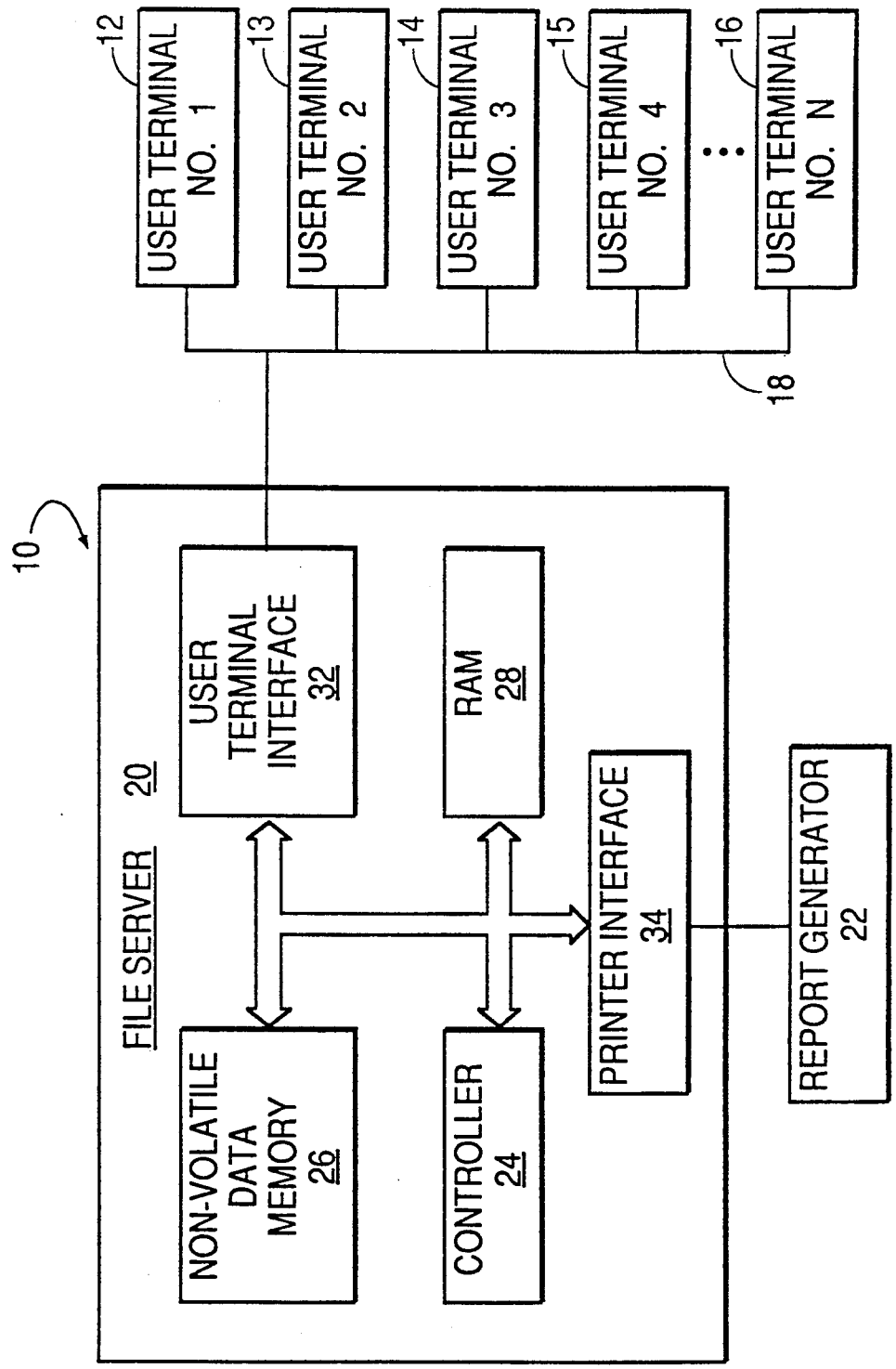
FIG. 1 is a schematic illustration of a computer implemented docket system designed in accordance with the subject invention.

For a better understanding of the subject invention, reference is made to the illustration in FIG. 1 in which is shown schematically a computer system of the type suitable for implementing the subject invention. In particular, FIG. 1 illustrates a local area network (LAN) 10 including a plurality of user terminals 12 through 16 which may take the form of desk top personal computers, portable lap top computers or other user terminals of the type employed now or in the future in organizations such as law firms wherein personnel are required to take actions within deadline calendar dates. A typical type of computer suitable as a user terminal or as the file server would be an IBM Personal Computer or IBM compatible or "clone". The various terminals are linked through cables, radio channels or a communications bus 18 to a file server 20 which may take the form of an upgraded personal computer having augmented memory and communications input/output interface circuits and ports for connection with the user terminals 12 through 16 as well as other system peripherals such as printers or other types of report generators 22.

As will be described in greater detail below, the docketing system of FIG. 1 serves an operator(s) and/or user(s) located at one or more of the user terminals. For example, in a typical intellectual property law firm, the system operator would normally be the senior docketing clerk of the firm who is primarily responsible for assuring that all attorneys are properly reminded of deadline dates for which they are responsible. To perform this function using the subject system, the senior docketing clerk would normally be assigned one of the user terminals from which the management functions of the system could be performed. In most installations, any one of the user terminals could serve this purpose although special log on procedures and security codes would be required, as explained more thoroughly below, before the system would allow full operator functions to be performed through any one of the user terminals. Alternatively, special hardware and software modifications could be made to allow only one of the user terminals to be used for full operator functionality. This later approach would increase system security and decrease the opportunity for inadvertent or intentional corruption of the data or system operation by unauthorized personnel.

Users of the subject docketing system, such as attorneys, secretaries, or paralegals, would normally be permitted access to the system to browse and/or obtain information from anyone of the user terminals. The log on procedures and security codes assigned to these users would, however, be different from that of the system operator and would thus preclude such users from executing certain types of data entry or data modification functions that could have the effect of corrupting system data.

Alternatively, the docketing system of the subject invention could be implemented on a stand alone computer terminal which uses its own self contained memory and controller for implementing the program of the subject invention and uses its own associated monitor and printer. In such situations, the users of the system would be restricted in obtaining access especially when the single terminal is being operated by the system operator.

File server 20 includes a controller 24 for executing the system program. Controller 24 is a standard component of every computer and may be embodied on an integrated chip. The preferred embodiment of this system is designed for implementation on LAN's using the MS/DOS (TM) operating systems and NOVELL (TM) network communications software. The system program, one embodiment of which is included at the end of this specification, includes a series of executable commands stored in a nonvolatile memory 26 which has the characteristic of retaining the stored information even when the system is de-energized. The system program, as well as the stored data relating to the patent and trademark cases entered into the system may be stored in a non-volatile memory 26. Non-volatile memory 26 may take the form of a magnetic hard drive, floppy disk or other type of permanent or semi-permanent recording media.

While executing the program of the subject invention or the LAN operating program, the controller 24 makes use of a random access memory 28 for temporarily storing digital signals to facilitate processing and controller operation. The controller is interconnected with non-volatile data memory 26 and random access memory 28 by data bus 30. As is clear from FIG. 1, data bus 30 also interconnects the system components with terminal interface 32 which is, in turn, connected with user terminals 12 through 16. Another interface 34 connects the file server to one or more of the system report generators 22 which may take the form of laser printers, ink jet printers, dot matrix printers or other types of hard copy report generators.

Figure 2:
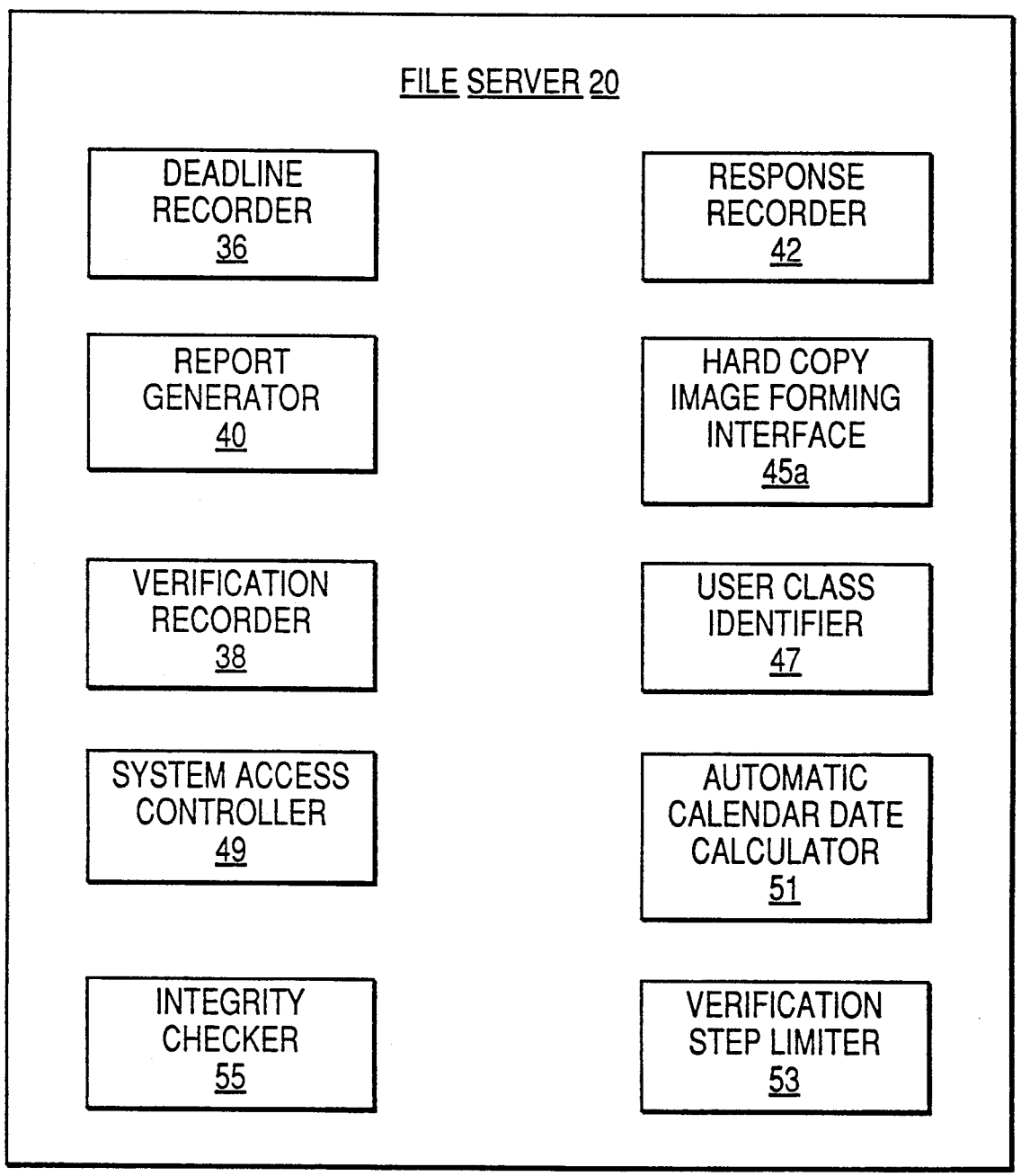
FIG. 2 is a schematic illustration of the file server employed in the system illustrated in FIG. 1 when the file server contains and is implementing a program designed in accordance with the subject invention.

Referring now to FIG. 2, the organization of the file server 20 of the subject docketing system is illustrated to emphasize the internal organization of the computer circuitry, data and program functions while executing the computer program. In particular, the circuitry of the file server 20, when executing the computer program of this invention, would be internally configured to form the components illustrated in FIG. 2. The actual hardware configuration used to implement the subject invention may take a variety of forms. Almost any type of digital computer capable of executing the necessary logic functions and data processing functions could be employed. Moreover, the specific program language, routines and commands may take a wide variety of forms. One example of a suitable program is included in the appendix of this specification. As will be described in more detail below, the non-volatile memory 26 (FIG. 1) will receive and store signals describing the particulars of patent and trademark cases for which the docketing system is responsible for docketing and reporting deadline calendar dates. At a minimum, each case would be identified by a case record key which would take the form of signals for uniquely identifying each case from all other cases recorded in the system. All other information about any particular case that is recorded in the non-volatile memory 26 would be stored by being associated with the case record key.

While executing the system program, the controller 24 of FIG. 1 will assign portions of the RAM 28 and will execute subroutines for configuring other portions of the file server to form at various times the means illustrated in FIG. 2. In particular, the file server may be operated to form a deadline recorder 36 operating under the control of the file server controller for receiving and storing in the nonvolatile memory unverified future calendar date signals associated with a unique case record key representing an initial human operator determined future calendar date by which an action must be taken in a law case identified by the case record key. The deadline recorder 36 may also be programmed to receive and record a word description of the deadline date. Normally, the deadline calendar date would be human operator determined by interpreting the requirement of an official action of a governmental agency such as the U.S. Patent and Trademark Office, or a U.S. Court. Alternatively, the deadline calendar date entered into the system may result from a human operator determined date by which an action must be taken of which the operator wishes to be reminded even though it is not required by a governmental agency. The deadline recorder 36 may be configured to require independent dual entry of all information to improve the integrity of the information entered into the system.

An essential of the subject system is that it operates with maximum accuracy and, as will be demonstrated below, the system is characterized by the capability of verifying the accuracy of the calendar information entered into the system. In particular, the system allows an indication to be stored that a particular deadline calendar date entered into the system has been verified. Moreover, the system is uniquely organized to provide a reminder to the operator and users that calendar date information entered into the system has yet to be verified by a human operator acting independently of the operator who initially entered the corresponding calendar deadline date. Preferably, the second human operator will have conducted the separate independent date determination by reading the original document setting the deadline date by searching out, organizing and reporting all unverified deadline calendar dates.

To accomplish the important system functions referred to above, the file server will be organized from time to time by the system program to form a verification recorder 38 for converting unverified future calendar date signals into verified future calendar date signals by receiving and storing in the non-volatile memory 26, in association with a future calendar date, a human operator generated verification signal indicating that a human operator has independently verified the accuracy of the corresponding future deadline calendar date.

Depending upon the manner in which the system is used, the verification step can be performed by the system operator or by another person, such as the secretary of the practitioner who is responsible primarily for the case. Ideally, the responsible practitioner would perform the verification step by reading and interpreting the official action which created the corresponding deadline calendar date. This important capability is at the heart of the subject invention because it allows enormous flexibility in how the subject docketing system is organized yet it encourages system users to perform a second verification step before the system will elevate a received and stored deadline calendar date to a fully "verified" status.

A firm or organization which adopts the subject invention could decide to implement the underlying docketing system in a variety of different ways. For example, the verification step following entry of a deadline calendar date could be performed immediately by another human operator by viewing the entered data on a monitor. Alternatively, the verification could take place only after a first report is formed in hard copy form and associated with a hard copy form of the corresponding law case before the case is given to the responsible practitioner or his secretary for independent calculation and verification of the correctness of the entered deadline calendar date. An important advantage of the disclosed system is that it would allow an organization to adopt a verification procedure involving a second human determination of each calendar date entered into the system. The system provides means for insuring that either the second determination takes place or the system operator is alerted that the second determination remains to be completed. The second independent calendar date calculation forced on the users of the system can add enormously to the accuracy of the entered calendar dates. By providing means for periodically scanning the system to determine the existence of unverified deadline calendar dates, further assurance is provided that no calendar date would remain without independent verification.

To implement the verification functionality of the system, the program is designed to form a report generator 40 for generating, in response to an operator entered case record key, an operator viewable first report of all unverified future calendar dates stored in the non-volatile memory 26 in association with that particular case record key. The stored word description of the required action by the recorded deadline calendar date may be included in this first type of report. The file server 20 may also include a response recorder 42 for receiving and recording in the non-volatile memory 26 response signals indicating that the action required has taken place, the date on which the response was taken and a description of the response taken. Accordingly, file server 20 receives unverified deadline calendar dates, a word description of the action required within the corresponding deadline calendar date, verification signals for indicating that the corresponding deadline calendar date has been independently verified, and an indication when the required action has been completed by receiving and storing the date of completion of the required action and a word description of the action taken.

The system program will further cause the file server to be configured internally to form a hard copy image forming interface 45a. When connected with one of the report generators 22, the interface 45a operates to generate signals suitable for creating a hard copy of a first report in the hard copy image forming device. The hard copy of the first report can be placed with a hard copy of the associated law case as will be discussed in more detail below.

File server 20 may also be configured by the system program to form a user class identifier 47 for establishing separate user classes including a system operator class and a practitioner class. Working with the class identifier 47 is a system access controller 49 for limiting the functions which can be performed by system users based on the class to which a user belongs whereby the system access controller 49 would operate to allow only users in the system operator class to use the deadline recorder 36 to enter, change and/or remove unverified future calendar dates in the non-volatile memory 26.

As will be described in greater detail below, the file server 20 may also be configured to form an automatic calendar date calculator 51 for establishing separate calendar date types, such as a response to a final rejection, and for automatically determining linked future calendar dates based on human operator entered dates of such type. The automatic calendar date calculator 51 would then cause the deadline recorder 36 to store these automatically determined dates in the same manner as human operator entered future calendar dates.

Since the automatically determined dates would not be subject to human error so long as the original human operator entered date is correct, the verification procedure established by the subject system would be limited to only the human operator entered dates. This function would be performed by a verification step limiter 53.

The disclosed system is programmed to perform a wide range of data integrity checks to insure that the deadline calendar dates entered into the system memory are accurate and internally consistent. For example, patent issue dates can be checked against the patent number to see if the issue date is appropriate based upon Patent and Trademark Office data relating patent numbers and issue dates. The same Patent Office issue date and patent numbers may also be used to check the integrity of future calendar dates recorded in the system for payment of patent maintenance fees now payable at 3½, 7½ and 11½ years following patent issuance. In particular, the subject system provides means for recording patent numbers in association with those case record keys which uniquely identify corresponding law cases involving the corresponding issued patents. The system also includes an integrity checker 55 (FIG. 2) which operates to receive human operator entered signals representing the range of patent numbers corresponding to the patents issued during predetermined periods of time spanning a pair of calendar dates. The integrity checker operates to determine if any case record keys are stored in the non-volatile memory for which appropriate future calendar date signals relating to patent maintenance fees are not stored in the system. The report generator is caused to generate a human operator viewable listing of case record keys for which appropriate maintenance fee deadline calendar dates are not found.

FIG. 3 illustrates a sample operator viewable first report 43 of the type formed by the subject invention. In particular, the report generator 40 of the subject system has been configured to include in the heading an eight digit number 44 in the first report 43 corresponding to the case record key for uniquely identifying a particular case in the system. For example, the number 0270-0988 may designate a patent application which has recently been filed. The report generator 40 is further designed to list in chronological order in column (a) a word description 46 for describing the action required prior to the corresponding deadline calendar date. Column (b) of the first report lists the actual deadline calendar date 48 which corresponds to the action listed in the corresponding row of column (a). Column (c) of first report 43 provides an indication of whether the corresponding deadline calendar date has been independently verified by reporting the verification signal 50 which has been entered. The verification signal may be, for example, the initials 50a (or other alphanumeric designation) of the person who has independently verified the deadline calendar date. Alternatively, the verification signal position 50b may appear blank to indicate that no independent verification has yet been recorded in the system. First report 43 further includes column (d) in which is recorded the date 52 upon which the corresponding required response described in column (a) was actually completed. Column (e) includes a word description 54 of the completed response.

In summary, report 43 forms a Table of Contents for a patent or trademark case in which a chronological history of all official actions associated with the corresponding case are recorded along with an indication of whether the corresponding date has been verified. This added feature insures that an entered, but unverified, deadline calendar date cannot linger in the system without coming to the attention of the system operator who could then take remedial action to insure that a proper verification of an entered deadline calendar date is undertaken by the responsible attorney, his secretary or other designated person.

While some patent and trademark practitioners (attorneys or agents) practice alone, most attorneys and agents practice in association with other attorneys or agents in law firms or corporate patent departments. Typically such associated attorneys and agents will share a common file system and common docketing reminder system even though only one practitioner will remain primarily responsible for each case entered into the docketing system. To accommodate situations of this sort, the subject docketing system provides the capability of storing in association with each case record key, an indication of the practitioner primarily responsible and where appropriate an indication of an associate practitioner who will operate under the supervision of the practitioner who is primarily responsible. Both the responsible practitioner and associate or "working" practitioner designation may be included in the first report generated by the report generator 40.

FIG. 4 is an elevational view of a second type of report 56 generated by a system designed in accordance with the subject invention. In particular, report 56 includes all of the unverified future calendar dates associated with a plurality of case record keys whereby said second report can operate to remind the system operator that future calendar dates recorded in the system remain unverified. This function is very important to the operation of the subject system because it allows the operator and users of the system to become aware and be reminded of any calendar deadline date that remains unverified within the system. To accomplish this function, report 56 includes a complete listing by responsible practitioner, identified at 58, of every case for which the practitioner is responsible having a deadline calendar date recorded in the system which has not been verified. This report lists only those unverified calendar dates which were entered into the system over a defined calendar period specified at 60. This limitation on the content of the second report 56 is important in allowing the second report to perform its intended function. In particular, the report will normally be generated to list all unverified calendar deadline dates which were entered more than a certain minimum period of days in the past to allow ample time for the entered dates to be verified in accordance with the normal procedures of the office or firm using the system. For most offices this minimum period would likely be 5-7 days to allow sufficient time for the corresponding hard copy file and official action to be reviewed by the responsible attorney and/or his secretary. Once the initially entered deadline calendar date has been independently calculated and verified, a verification signal can be entered into the system as described above to show that the proper date has been entered and has been properly verified. For a patent practice, the time period should not extend over more than approximately 10 days since some deadline dates set by the U.S. Patent and Trademark Office can be as short as 15-20 days.

Each unverified calendar date is identified in the left hand column at a location identified, for example, at 62 and a description of the action required for the corresponding deadline calendar date is listed at 64. Specified at 66 is the type of calendar deadline date which for second reports 56 of the type shows in FIG. 4 will always be of the "due" type. If any "tickler" dates are also recorded in the system in association with the "due" date, these tickler dates are listed under the "due" at locations identified by the numeral 68. To assist the system operator and/or the responsible practitioner to identify the case whose entered deadline calendar date remains unverified, a number of identifying data fields may be included in area 70 of the second report in association with each unverified deadline calendar date. In particular, the case record key 72 for the corresponding case is included. Other firm identification numbers, such as indicated at 74, may be included along with the patent no. 76, the inventor's name 78, the assignee's name 80, and the title 82.

FIGS. 5(a) and 5(b) together illustrate a third type of human viewable report 84 for listing all calendar deadline dates recorded in the system wherein the dates fall within a specified calendar period, defined at 86, and the dates are listed chronologically under calendar date headings 88. For example, report 84 covers the period Apr. 1, 1991 through Apr. 6, 1991. The subject system is designed to produce a listing of calendar dates in this third type of report grouped by responsible practitioner or working practitioner, specified at 90. Alternatively, report 84 may include all calendar deadline dates recorded in the system grouped by each day of a specified calendar period including the calendar dates for all practitioners. The type of calendar deadline date may be specified as "due" at 92 meaning that the action required as defined at 94 is actually due that day. Alternatively, the calendar date may be merely a "tickler" as specified at 96 which means that tile corresponding action required as defined at 98 is due at some time in the future as specified at 100.

Associated with each calendar deadline date entry appearing in report 84 of FIG. 5(a) is a description 102 of the patent case with which the deadline date is associated. In particular, description 102 includes the corresponding law case record key specified at 104, the assignee 106 and the title 108.

In one embodiment of this invention the system can be programmed to receive a variety of information in different fields. FIG. 6 is an elevational view of a hard copy printout of all of the information fields associated with a particular patent law case entered into the system. As is apparent from FIG. 6, the system is capable of receiving information in the following fields:

| | |
|---|---|
| 110 | Type of Case, i.e. - copyright, design patent, utility patent, trademark, service mark, etc. |
| 112 | Client Case Identification |

Each deadline calendar date which is entered into the system includes a number of separate fields of information identified in FIG. 7. In particular, these fields include

| | |
|---|---|
| 146 | Docket Number |
| 148 | Old Docket Number |
| 150 | Title/Mark |
| 152 | Responsible Attorney |
| 154 | Serial Number |
| 156 | Filing Date |
| 158 | Registration Number |
| 160 | Issue Date |
| 162 | Associate Attorney |
| 164 | Base Date (date of Official Action) |
| 166 | Task Code (Issue Fee due, Official Action, final Rejection Restriction Requirement) |
| 168 | Task |
| 170 | Our Date |
| 172 | Response Required |
| 174 | Subtask Code |
| 178 | Subtask |
| 180 | Comment |

Figure 8:
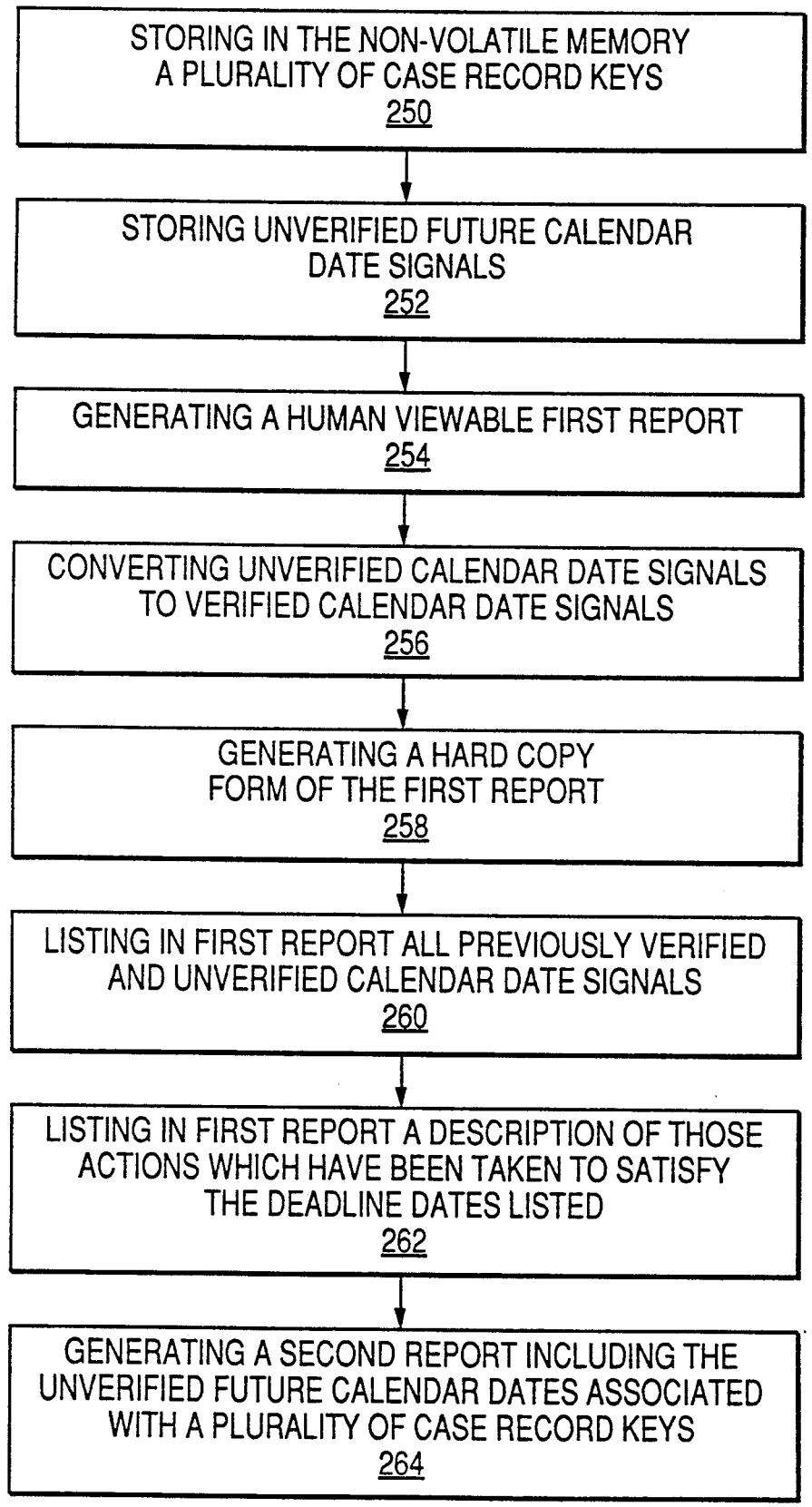
FIG. 8 is a chart of the steps forming the method of this invention for docketing and reporting deadline calendar dates for a plurality of law cases.

FIG. 8 is a chart illustrating the steps involved in the method aspects of the subject invention. In particular, FIG. 8 disclose the steps in a method for docketing and reporting deadline calendar dates for a plurality of law cases by utilizing a programmed computer system having a non-volatile memory and a report generator which is capable of generating a report based on the results of a search and compare function under control of the computer program. The method includes step 250 of storing in the non-volatile memory a plurality of case record keys for uniquely identifying corresponding law cases. The next step 252 involves storing unverified future calendar date signals associated with a case record key uniquely identifying a corresponding law case representing an initial human operator determined future calendar date by which an action must be taken in the law case identified by the case record key. At periodic intervals, a first human viewable report 254 (See FIG. 3) may be generated of all unverified future calendar dates associated with the law case identified by the operator entered case record key. Next, the subject method involves the step 256 of converting stored unverified future calendar date signals to verified future calendar date signals by storing in the nonvolatile memory in association with the corresponding stored calendar date a verification signal generated by a human operator who has independently calculated the calendar date appearing in the first human viewable report and has verified the accuracy of the corresponding stored future calendar date appearing in th first human viewable report.

In its more detailed aspects, the disclosed method includes the step 258 of generating a hard copy form of the first human viewable report and the step 260 of providing in hard copy form of the first human viewable report a listing of previously stored and verified calendar date signals to form a record of all verified and unverified calendar date signals stored in the system in association with the corresponding law case.

The method of FIG. 8 further includes the step 262 of providing in the hard copy form of the first human viewable report a description of those actions which have been taken to satisfy the deadline listed deadline calendar dates to form a Table of Contents for the hard copy of the corresponding law case. This step may also include the step of providing closable file folders for receiving when opened hard copies of corresponding law cases and including the step of generating a new hard copy of the corresponding human viewable report each time a new entry is stored in the system.

FIG. 8 also shows that the disclosed method includes the step 264 of generating a second human viewable report including the unverified future calendar dates associated with a plurality of case record keys whereby the second human readable report can operate to remind the system operator that future calendar dates recorded in the system remain unverified.

Figure 9:
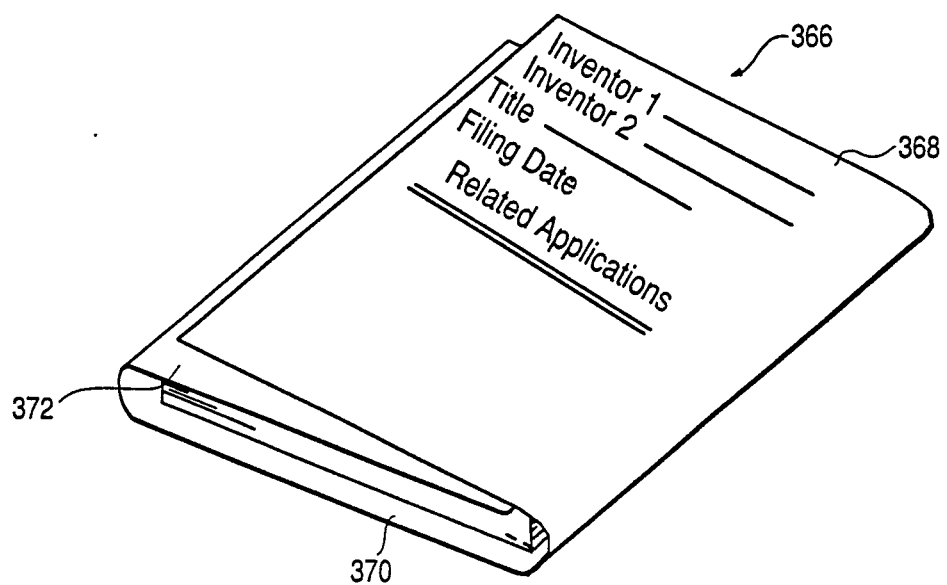
FIG. 9 is a perspective view of a hard copy of a law case contained within a file folder designed to receive and display a first report generated by the docketing system designed in accordance with the subject invention.
Figure 10:
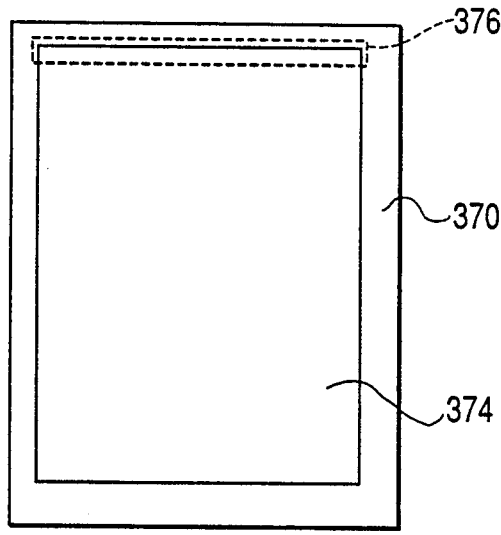
FIG. 10 is an elevational view of the back panel of the file folder illustrated in FIG. 9.

Reference is now made to FIG. 9 in which is illustrated a file folder 366 for containing a hard copy of papers associated with a law case, such as a patent application, of the type which would require the docketing of future calendar deadline dates. File folder 366 is provided with the multiple hinged panels 368, 370 and 372 to which may be attached certain types of papers. For example, client correspondence might be attached to panel 368, U.S. Patent and Trademark Office papers attached to panel 370 and drawings to panel 372. In prior art folders, it has been conventional to provide law case information of the type illustrated in FIG. 6 and Table of Contents information about actions due and actions taken on the outside of one of the panels such as illustrated on the back side of panel 370. Much of this information duplicates the information entered into the subject computer implemented docketing system as appearing in FIGS. 3 and 6. Thus, to avoid duplication and conserve time, and to assure accuracy, a hard copy report including, at least, the information in FIGS. 3, and optionally the information of FIG. 6, can be generated by the subject system and incorporated with the file folder of FIG. 9. However, attachment of such a report on the inside of the file folder would require that the folder be opened in order to ascertain the information in the report. Accordingly, as illustrated in FIG. 10, one of the folder panels, such as panel 370, may include a transparent window 374 and an inside attachment means 376, such as a clip or pocket shown in dashed lines for holding the report in a position to allow the contents of the report to be viewed through the window 374. Obviously, the window may be covered with transparent material, such as plastic, or may be open. Preferably the outside of the folder would be free of edges, lips or projections to allow the folder to be slid into and out of a filing system without obstruction.

Figure 11:
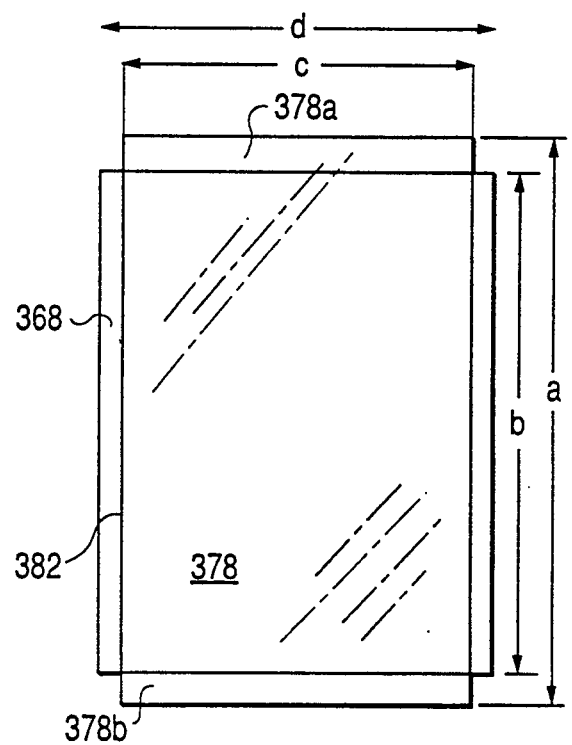
FIG. 11 is an elevational view of the file folder of FIG. 9 including an alternative arrangement for receiving and displaying a first report generated by the subject system.

Another arrangement to that illustrated in FIGS. 9 and 10 would be to provide a single sheet 378 of transparent plastic, such as illustrated in FIG. 11, having a top to bottom dimension "a" exceeding the top to bottom dimension "b" of panel 368 while having a lateral width "e" no greater than the width "d" of panel 368. Sheet 378 could then be placed against the outside surface of panel 368 and the top and bottom margins 378a and 378b could then be folded inwardly and secured on the inside surface of panel 368. One lateral edge 380 of sheet 378 could be attached, such as by adhesive packaging tape to panel 368 to form a pocket having an opening along edge 382. Each newly generated Table of Contents could then be placed within the pocket formed by sheet 378 and the old Table of Contents could be removed and discarded.

A computer implemented deadline docketing system has thus been disclosed which is organized to provide the highest possible degree of integrity by insuring that the human operator entered data is correct by providing dual entry capability and special data integrity checks and particularly by providing a mechanism to insure that every calendar deadline date is human operator verified after being entered into the system. A wide variation is contemplated in how the system might be implemented. In particular, the details of the computer implemented program may be changed, as for example, by being written in a different language for implementation on any type of computer hardware system such as personal computer, local area networks, mini computer or main frame systems. The particular fields of information may be changed and the operator viewable screens may be modified to serve the needs of a particular user. The disclosed system is particularly well adapted for generation of a new hard copy Table of Contents each time a new calendar entry is entered or responded to. The hard copy Table of Contents may be associated with a hard copy of the corresponding law case which may have a special transparent pocket through which the Table of Contents may be viewed.

I claim:

1. A human operator controlled computer implemented deadline docketing system for a plurality of cases, comprising non-volatile memory means for retaining a program including a series of executable commands for implementing the docketing system and for retaining stored signals when the system is de-energized including a plurality of case record keys uniquely identifying each case;

controller means connected with said non-volatile memory means for executing said program to operate the docketing system;

deadline recording means operating under the control of said controller means for receiving and storing in said non-volatile memory means unverified future calendar date signals associated with a unique case record key representing an initial human operator determined future calendar date by which an action must be taken in a case identified by the record key;

report generating means operating under the control of said controller means for generating in response to an operator entered case identifier key an operator viewable first report listing and identifying all unverified future calendar dates stored in said non-volatile memory means associated with the operator entered case record key; and verification recording means operating under the control of said controlling means for converting unverified calendar date signals into verified future calendar date signals by receiving and storing in said non-volatile memory means in association with a future calendar date appearing in said first report a human operator generated verification signal indicating that the human operator has independently verified the accuracy of the corresponding future calendar date appearing in said first report.

2. A docketing system as defined by claim 1, wherein said report generating means operates to generate a second report including the unverified future calendar dates associated with a plurality of case record keys whereby said second report can operate to remind the system operator that future calendar dates recorded in the system remain unverified.

3. A docketing system as defined by claim 2, wherein said report generating means operates to include in said second report only those unverified future calendar dates which have remained unverified within the system for a predetermined minimum time to permit adequate time for verification to take place before a reminder is generated.

4. A docketing system as defined by claim 2, wherein said plurality of law cases include the cases being handled by a group of law practitioner, wherein only one practitioner is primarily responsible for insuring that required actions are undertaken within the deadline dates indicated by the future calendar dates recorded in the system and wherein said second type of report includes all of the cases for which unverified future calendar dates remain in the system, said unverified future calendar dates being grouped in said second report according to the practitioner primarily responsible.

5. A docketing system as defined by claim 4, wherein said report generating means operates to include in said second report only those unverified future calendar dates which have been verified for a predetermined time within the system to permit adequate time for verification by the practitioner primarily responsible for the case before a reminder is generated.

6. A docketing system as defined by claim 5, further including response recording means for receiving and recording in said non-volatile memory means response signals indicating that the action required in response to a particular stored future calendar date has taken place, and wherein said report generating means operates to include in each said first reports all verified future calendar dates resulting from operation of said verification recording means and all response signals associated with previously stored calendar dates associated with the operator entered record key.

7. A docketing system as defined by claim 6, wherein said response recording means also operates to record an action description for describing the required action for each stored future calendar date and wherein said response recording means also operates to record a response description for describing the response undertaken in association with each said calendar date.

8. A docketing system as defined by claim 7, wherein said report generating means operates to cause said first report to include all stored calendar dates associated with the corresponding operator entered record key and any corresponding action descriptions, an indication of whether the corresponding calendar dates have been verified, an indication of whether a response has taken place within the calendar date deadline including any corresponding response description, and wherein said information is organized in chronological order to form a list of all actions and responses which have taken place and all future actions which must be undertaken in the identified case.

9. A docketing system as defined by claim 8, further including at least one video monitor and wherein said report generating means includes a video monitor interface for forming signals suitable for creating an image of said first and second reports on said monitor.

10. A docketing system as defined by claim 9, further including at least one hard copy image forming device and wherein said report generating means includes a hard copy image forming device interface for forming signals suitable for creating a hard copy of said first report in said hard copy image forming device, whereby the hard copy of said first report can be placed with a hard copy file of the associated case identified by the corresponding record key, whereby said hard copy form of said first report will form a chronological table of contents of all recorded actions and responses for the hard copy file of the corresponding case.

11. A docketing system as defined by claim 10, wherein said hard copy image forming interface operates to cause said hard copy image forming device to form a hard copy form of said second report which may be given to the corresponding responsible practitioners as a reminder that future calendar dates remain unverified.

12. A docketing system as defined by claim 4, further including user class identifying means for establishing separate user classes including a system operator class and a practitioner class, and further including a system access controller means for limiting the functions which can be performed by system users based on the class to which a user belongs, said system access controller means operating to allow only users in the system operator class to use said deadline recording means to enter, change or delete unverified future calendar dates in said non-volatile memory means.

13. A docketing system as defined by claim 1, wherein said report generating means also operates to generate a daily docket report listing all calendar dates corresponding to signals stored in said nonvolatile memory means by said deadline recording means wherein the calendar dates are grouped by date and each calendar date appears in association with the corresponding record key.

14. A docketing system as defined by claim 13, wherein said plurality of law cases include the cases being handled by a group of law practitioners wherein only one practitioner is primarily responsible for insuring that required actions are undertaken within the deadline dates indicated by the future calendar dates recorded in the system and wherein said daily docket report further groups all calendar dates for a given day by responsible practitioner.

15. A docketing system as defined by claim 14, wherein said deadline recording means also operates to record in said non-volatile memory means an action description for describing the required action for each stored future calendar date and wherein said report generating means operates to include in said daily docket report the stored description associated with each calendar date listed in said daily docket report.

16. A docketing system as defined by claim 1, further including an automatic calendar date calculation means for establishing separate calendar date types and for automatically causing said deadline recording means to store additional future calendar date signals linked to predefined types of human operator entered calendar dates.

17. A docketing system as defined by claim 16, further including verification step limiting means causing all calendar dates generated automatically by said automatic calendar date calculation means to be treated by the system as though each automatically generated date has been human operator verified using said verification recording means.

18. A docketing system as defined by claim 16, wherein said automatic calendar date calculation means operates to automatically calculate tickler date signals for specific types of calendar dates for storage in said non-volatile memory in association with each corresponding type of calendar date, said tickler date being automatically calculated from the associated human operator entered calendar date.

19. A docketing system as defined by claim 1, wherein the plurality of cases include patent applications and issued patents and the calendar dates relate to deadlines for responding to Patent and Trademark Office actions and maintenance fee payments and further including data integrity checking means for determining potentially erroneous or missing calendar date signals in said non-volatile memory means.

20. A docketing system as defined by claim 19, wherein said non-volatile memory means includes patent number signals stored therein in association with those case record keys which uniquely identify a case pertaining to an issued patent and wherein said integrity checking means operates to receive human operator entered signals representing the range of patent numbers corresponding to the patents issued during predetermined periods of time spanning a pair of calendar dates and further wherein said integrity checking means operates to determine if any case record keys are stored in said non-volatile memory means for which appropriate future calendar date signals relating to patent maintenance fees are not stored in said nonvolatile memory means and still further wherein said integrity checking means operates to generate a human operator viewable listing of case record keys for which appropriate calendar dates are not found.

21. A docketing system as defined by claim 1, wherein said deadline recording means includes dual data entry means for requiring correspondence between two separate human operator entries for each future calendar date before signals representing the corresponding future calendar date can be stored in said non-volatile memory including dates of official actions and corresponding response periods associated with said official actions.

22. A method for docketing and reporting deadline dates for a plurality of cases by utilizing a programmed computer system having a non-volatile memory and a report generator which is capable of generating a report based on the results of a search and compare function under control of the computer program, comprising the steps of
storing in the non-volatile memory a plurality of case record keys uniquely identifying a case, storing unverified future calendar date signals associated with a unique case record key identifier representing an initial human operator determined future calendar date by which an action must be taken in a case identified by the case record key,
periodically generating a human viewable report listing and identifying all unverified future calendar dates associated with the case identified by the operator entered case record key, and
converting stored unverified future calendar date signals to verified future calendar date signals by storing in the non-volatile memory in association with the corresponding stored calendar date a verification signal generated by a human operator who has independently calculated the calendar date appearing in the first human viewable report and has verified the accuracy of the corresponding stored future calendar date appearing in the first human viewable report.

23. A method for docketing and reporting deadline dates as defined in claim 22 further including the step of generating a hard copy form of the first human viewable report.

24. A method for docketing and reporting deadline dates as defined in claim 23 further including the step of providing in the hard copy form of the first human viewable report a listing of previously stored and verified calendar date signals to form a record of all verified and unverified calendar date signals stored in the system in accordance with the corresponding case.

25. A method for docketing and reporting deadline dates as defined in claim 24 further including the step of providing in the hard copy form of the first human viewable report a description of those actions which have been taken to satisfy the deadline listed deadline calendar dates to form a Table of Contents for the hard copy of the corresponding case.

26. A method for docketing and reporting deadline dates as defined in claim 25 further including the step of providing closable file folders for receiving opened hard copies of corresponding cases and including the step of generating a new hard copy of the corresponding human viewable report each time a new entry is stored in the system which would appear in the human viewable report for the corresponding case.

27. A method for docketing and reporting deadline dates as defined in claim 28 further including the step of generating a second human viewable report including the unverified future calendar dates associated with a plurality of case record keys whereby the second human readable report can operate to remind the system operator that future calendar dates recorded in the system remain unverified.

28. A docketing system as defined in claim 10, further including a plurality of file folders, adapted to contain therein hard copies of corresponding cases identified by said case record keys, each said file folder including attaching means for attaching in said file folder a hard copy of said first report for the corresponding case.

29. A docketing system as defined in claim 28, wherein each file folder includes a transparent-outer panel and wherein said attaching means is adapted to secure said hard copy of said first report on the interior side of said transparent panel in a position which allows said first report be viewed from the exterior of said file folder.

* * * * *